(12) United States Patent
Baker et al.

(10) Patent No.: US 8,027,518 B2
(45) Date of Patent: Sep. 27, 2011

(54) AUTOMATIC CONFIGURATION OF DEVICES BASED ON BIOMETRIC DATA

(75) Inventors: Nicholas R. Baker, Cupertino, CA (US); James M. Alkove, Woodinville, WA (US); James E. Allard, Seattle, WA (US); David Sebastien Alles, Seattle, WA (US); Steven Drucker, Bellevue, WA (US); James C. Finger, Kirkland, WA (US); Todd E. Holmdahl, Redmond, WA (US); Oliver R. Roup, Seattle, WA (US); David H. Sloo, Menlo Park, CA (US); Curtis G. Wong, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 926 days.

(21) Appl. No.: 11/767,733

(22) Filed: Jun. 25, 2007

(65) Prior Publication Data

US 2008/0317292 A1    Dec. 25, 2008

(51) Int. Cl.
*G06K 9/00* (2006.01)
(52) U.S. Cl. ........ 382/115; 340/5.52; 345/169; 382/313
(58) Field of Classification Search ............... 340/5.52, 340/825.69; 382/115
See application file for complete search history.

(56) References Cited

U.S. PATENT DOCUMENTS

| | | | |
|---|---|---|---|
| 6,327,346 B1 * | 12/2001 | Infosino | 379/88.02 |
| 6,982,697 B2 | 1/2006 | Wilson et al. | |
| 6,990,639 B2 | 1/2006 | Wilson | |
| 7,038,661 B2 | 5/2006 | Wilson et al. | |
| 7,225,142 B1 | 5/2007 | Apte et al. | |
| 7,564,369 B1 * | 7/2009 | Adams et al. | 340/825.69 |
| 7,800,592 B2 * | 9/2010 | Kerr et al. | 345/173 |
| 2002/0019763 A1 | 2/2002 | Linden et al. | |
| 2002/0034280 A1 * | 3/2002 | Infosino | 379/88.02 |
| 2004/0060059 A1 * | 3/2004 | Cohen | 725/30 |
| 2004/0257196 A1 * | 12/2004 | Kotzin | 340/5.52 |
| 2005/0223235 A1 * | 10/2005 | Nicholas | 713/186 |
| 2006/0190974 A1 | 8/2006 | Lee | |
| 2006/0197750 A1 * | 9/2006 | Kerr et al. | 345/173 |
| 2006/0250213 A1 * | 11/2006 | Cain et al. | 340/5.52 |
| 2007/0143824 A1 * | 6/2007 | Shahbazi | 726/1 |
| 2007/0220575 A1 | 9/2007 | Cooper et al. | |
| 2007/0238491 A1 * | 10/2007 | He | 455/569.2 |
| 2008/0128495 A1 * | 6/2008 | Weintraub et al. | 235/382 |
| 2009/0146779 A1 * | 6/2009 | Kumar et al. | 340/5.31 |
| 2009/0306983 A1 * | 12/2009 | Bhandari | 704/251 |

OTHER PUBLICATIONS

Chung et al., "Determinants of Temporal Variations in Generic Advertising Effectiveness," *Agribusiness*, vol. 16, issue 2, pp. 197-214 (Apr. 2000).

* cited by examiner

*Primary Examiner* — Gregory M Desire
(74) *Attorney, Agent, or Firm* — Klarquist Sparkman, LLP

(57) ABSTRACT

The claimed subject matter relates to an architecture that can obtain biometric data from a user as the user interacts with a device. Based upon the obtained biometric data, the architecture can determine an identity of the user and automatically apply settings associated with that particular user to the device. The settings can relate to a physical configuration of the device (or aspects, features, and/or peripherals of the device), as well as to a data set employed by the device (or components of the device). As such, a user of the device can benefit from enhanced efficiency, utility, and/or convenience.

18 Claims, 10 Drawing Sheets

AUTOMATIC CONFIGURATION OF DEVICES BASED ON BIOMETRIC DATA

CROSS-REFERENCE TO RELATED APPLICATIONS

This application is related to co-pending U.S. patent application Ser. No. 11/767,720 filed Jun. 25, 2007 entitled "MINING IMPLICIT BEHAVIOR", and is also related to co-pending U.S. patent application Ser. No. 11/767,731 filed Jun. 25, 2007 entitled "ENVIRONMENT SENSING FOR INTERACTIVE ENTERTAINMENT", both of which are being filed concurrently. The entireties of these applications are incorporated herein by reference.

BACKGROUND

Conventionally, there are many systems that configure devices based upon settings customized for a particular user. Often, these systems require the user to enter a password in order to access and apply that particular user's settings. In other cases, the systems merely require that the user make a selection (e.g., button 1 is mapped to user 1, button 2 is mapped to user 2, and so on), however, in the latter case, such systems do not provide any means of identification or verification. For example, user 2 could accidentally or purposefully press button 1 and the device would be configured with the settings of user 1.

Biometric data such as fingerprints, DNA, voice patterns and the like have long been employed for purposes such as identification as well as authentication, however, there is very little research or work directed toward employing biometrics for the sake of convenience. While biometric data is often an effective tool for identification, it suffers from numerous problems when used for authentication. Namely, many systems that rely upon biometrics for authentication can be readily circumvented by common fraudulent means, such as obtaining samples of the biometric (which can often be an extremely easy task for those skilled in this type of fraudulent behavior), and then copying or mimicking the samples (or utilize the samples themselves) to fool the authentication system.

Ironically, biometrics are often only employed for authentication when highly important, critical, expensive, and/or secret ends are involved, even though biometric authentication is not generally among the strongest or most effective means for authentication conventionally known. Moreover, when the stakes are high (e.g., highly important, critical, expensive, and/or secret ends), that in itself can provide a powerful incentive or motive to entice fraudulent behavior. However, there is very little incentive to fraudulently circumvent an authentication system when there is little or nothing to be gained from doing so. For example, there is often a very strong incentive to fraudulently circumvent an authentication system protecting a top secret military device or a multimillion dollar asset account, but no strong incentive to circumvent an authentication system for, say, a user's list of favorite television channels.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one aspect thereof, comprises an architecture that can be operatively coupled to a device and wherein the architecture can facilitate automatic configuration of the device based upon a determination of a user's identity. According to one aspect, the architecture can be remote from the device, but it is to be appreciated that in accordance with another aspect, the architecture can be a component of the device. In accordance therewith, an identity component can receive a verifiable identification input such as a biometric of a user of the device, and then employ the biometric to determine an identity of the user. The architecture can also include a configuration component that can retrieve settings associated with the user and apply the settings to the device.

It should be understood that the architecture disclosed and claimed herein can relate to a very broad range of devices, biometrics, and settings. For example, the devices can range from consumer electronic devices or software applications to jewelry and attire to household decor to workout devices to automobiles as well as many other device types. Hence, the settings applied to the device can also range from physical configurations (e.g., adjusting the firmness of a mattress or the resistance of a weight bench) to settings relating to a data set (e.g., accessing a tailored multimedia library or computer-implemented preferences). Likewise, the biometric employed to determine a user's identity can be include, but is not limited to hand-based biometrics (e.g., fingerprints, grip configurations, hand geometry), facial-based biometrics (e.g. thermograms, retinas, iris, earlobes, forehead), behavioral biometrics (e.g., signature, voice, gait, gestures).

The disclosed architecture can also include an intelligence component that can, inter alia, determine or infer preferable biometrics to employ based upon on or more of: a type of device, features included in the device, a manner in which the user interacts with the device, a size of a potential set of users, or observed biometric distinctions between the set of potential users. In addition, the intelligence component can also infer user settings for one or more devices such that it need not be necessary in all cases for the user to manually configure his or her own settings with respect to the one or more devices.

In accordance with some but not all aspects, the architecture is not necessarily intended to provide a strong form of authentication like many conventional biometric-based systems, but rather, to provide a ready form of identification that can be employed to facilitate greater convenience to a user of the device.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
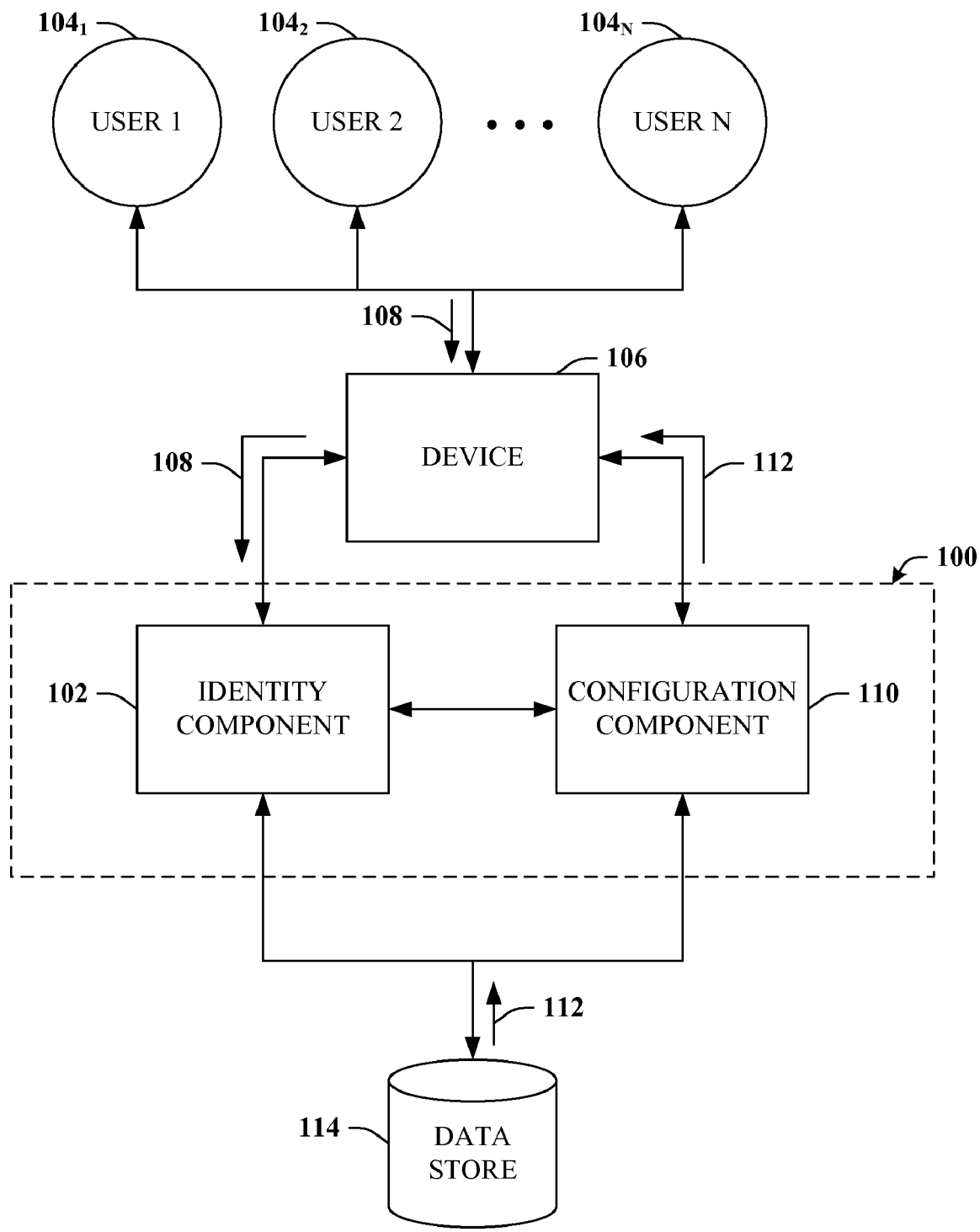
FIG. 1 is a block diagram of a system that is operatively coupled to a device, wherein the system can automatically configure the device based upon, e.g. identity detection.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . smart cards, and flash memory devices (e.g. card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, a system 100 that is operatively coupled to a device, wherein the system 100 can automatically configure the device based upon, e.g. identity detection is depicted. Generally, the system 100 can include an identity component 102 that can determine an identity of a user $104_1$-$104_N$, who can be referred to herein either collective or individually as user(s) 104. Ordinarily, the users 104 are potential users of a device 106, which can, but need not, include all or any set or subset of persons or identifiable entities. The identification component 102 can determine the identity of a current user 104 based upon verifiable identification input 108 associated with the user 104. Typically, the verifiable identification input 108 may, but need not, provide an extremely high level of authentication. Furthermore, the verifiable identification input 108 can be, but need not be unique for all potential users 104, but normally is unique for a particular set of users 104. However, the verifiable identification input 108 is generally more than merely a selection or indication by the user 104, for instance requiring some level of verification and/or providing some level of distinction over other potential users 104. Moreover, the verifiable identification input 108 need not require a volitional act on behalf of the user 104. Rather, it can be automatically ascertained by the device 106, identity component 102, and/or the system 100. One example of the verifiable identification input 108 can be a user 104 biometric, which is discussed in more detail infra in connection with FIGS. 2-4.

In order to determine the identity of the user 104, the identity component 102 can, e.g., access a data store 114. For example, the data store 114 can include templates previously collected, inferred, defined, or established that relate to the verifiable identification input 108. Thus, according to one aspect of the claimed subject matter, the identity component 102 can match newly received verifiable identification input 108 to templates stored in the data store 114. In addition, the identity component 102 can update or manage templates as well as create new templates (e.g., a template for a new user 104) as verifiable identification input 108 is received. It is to be understood that the verifiable identification input 108 need not be received directly from a user, but can, e.g., be supplied by other sources, such as other data stores 114.

The system 100 can also include a configuration component 110 that can retrieve settings 112 associated with the user 104 of the device 106. In addition, the configuration component 110 can apply the settings 112 to the device 106. For example, the configuration component 110 can be operatively connected to the identity component 102. Thus, once the identity component 102 determines the identity of the user 104 of the device 106, the configuration component 110 can, e.g., access the data store 114 to retrieve the settings 112 associated with that user 104 and automatically configure the device 106 in accordance with the settings 112. The configuration component 110 can configure the device 106 in a variety of ways, largely based upon, e.g., the type of device 106, the current user 104, the nature of the settings 112 associated with the current user 104, and so forth, which is further described with reference to FIG. 5. However, as a brief introduction it should be understood that the configuration component 110 can apply the settings 112 to the device 106 based upon whether the device 106 is a handheld electronic device, an I/O peripheral, or a controller that controls peripherals or aspects of one or more devices 106. Accordingly, the configuration component 110 can apply settings 112 that affect a physical configuration of the device 106 (e.g., the default speed or resistance for an exercise device) as well as a data set employed by the device 106 (e.g., the default music library for a multimedia device).

With the foregoing in mind, it should also be appreciated that at least one of the device 106 or the identity component 102 can include an input component (not shown) that is configured to receive the verifiable identification input 108. For example, the input component can be reader, scanner, detector, sensor, or some other suitable component that can obtain a biometric from the user 104. The input component can be specifically tailored to the device 106 such that a particular type of biometric can be easily obtained. For example, a handheld electronic device is particularly well suited to readily obtain biometrics related to a user's 104 hands, e.g., fingerprint, hand geometry, grip configuration, etc., whereas an earpiece might be better suited to obtain a different type of biometric such as a biometric relating to a user's 104 earlobe, for instance.

Although not expressly depicted in FIG. 1, it is to be appreciated that the device 106 can comprise the system 100 as well as the data store 114. In other aspects, the device 106 and/or the data store 114 can be remote from the system 100, but commutatively connected and/or interfaced to the system 100 by way of wired or wireless communication that is known in the art or within the spirit and scope of the appended claims. In either case, whether the system 100 is included in the device 106 or remotely interfaced, the data store 114 can be likewise included in the device 106, remotely interface by way of the system 100 (e.g., included or accessed by way of the system 100), or remotely interfaced independently of the system 100 (e.g., remote from both the device 106 and the system 100).

Hence, a variety of topologies are available to benefit and/or facilitate wide-ranging applications for the claimed subject matter, wherein many different considerations such as cost, privacy, utility, etc. can be addressed and/or optimized. For example, a system 100 and data store 114 that is remote from the device 106 can be less expensive for manufacturing devices 106, whereas including one or both of the system 100 or data store 114 might facilitate higher levels of security and/or privacy. Appreciably, the data store 114 (or portions thereof) can be managed and/or maintained by the user 104 even if it is remote from the device 106, or managed/maintained by an third party to provide many different applications that can potentially affect issues of cost, privacy, availability, and utility.

Figure 2:
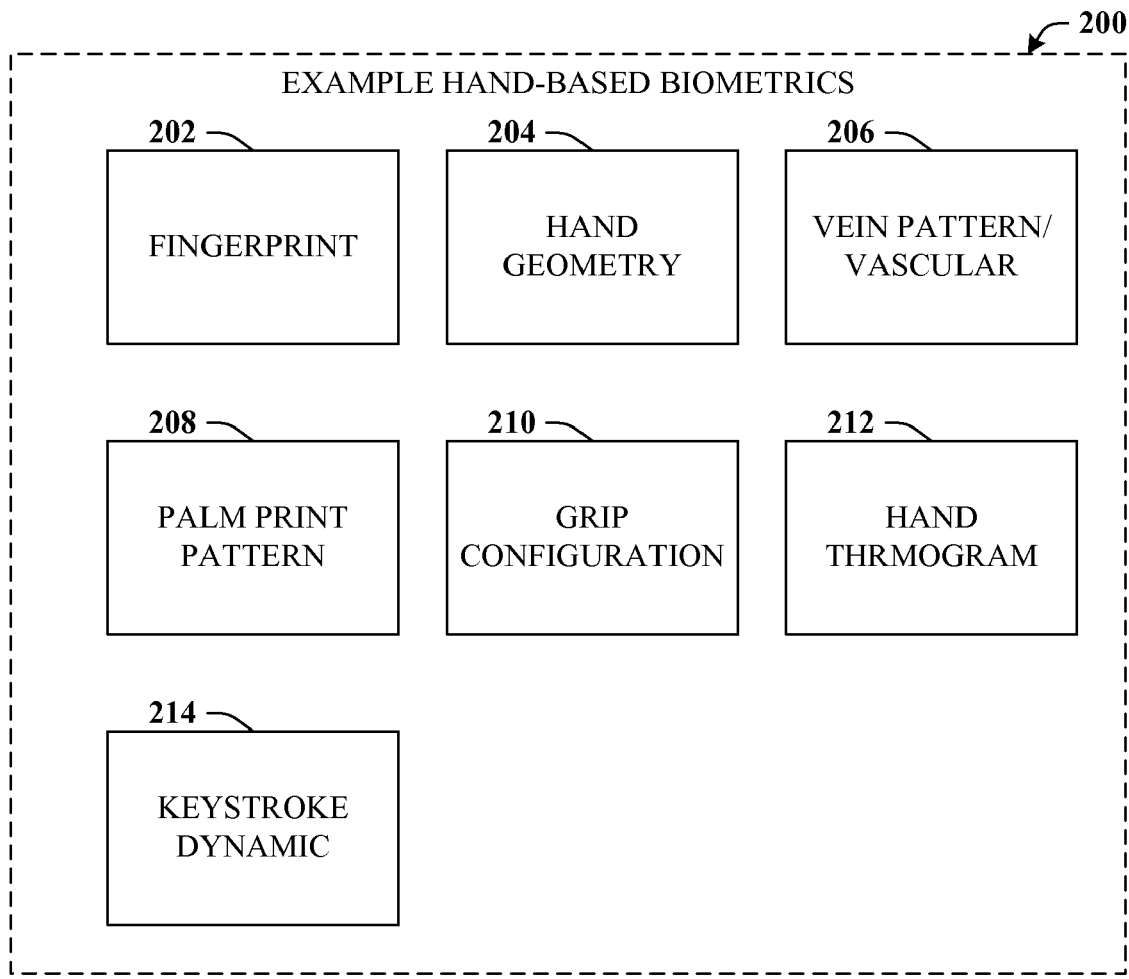
FIG. 2 illustrates a block diagram of example hand-based biometrics that can be employed by the system 100.
Figure 3:
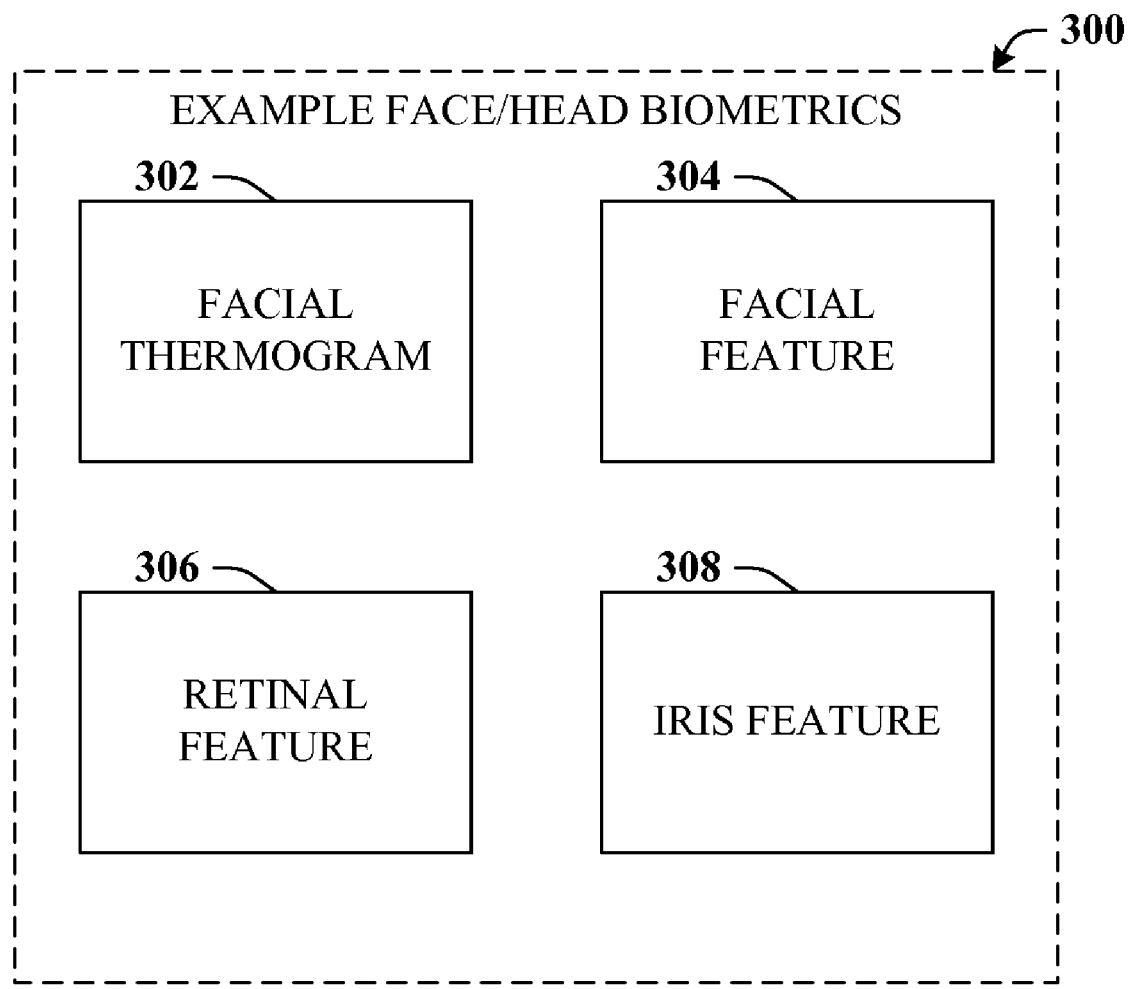
FIG. 3 depicts a block diagram of example face- or head-based biometrics that can be employed by the system 100.
Figure 4:
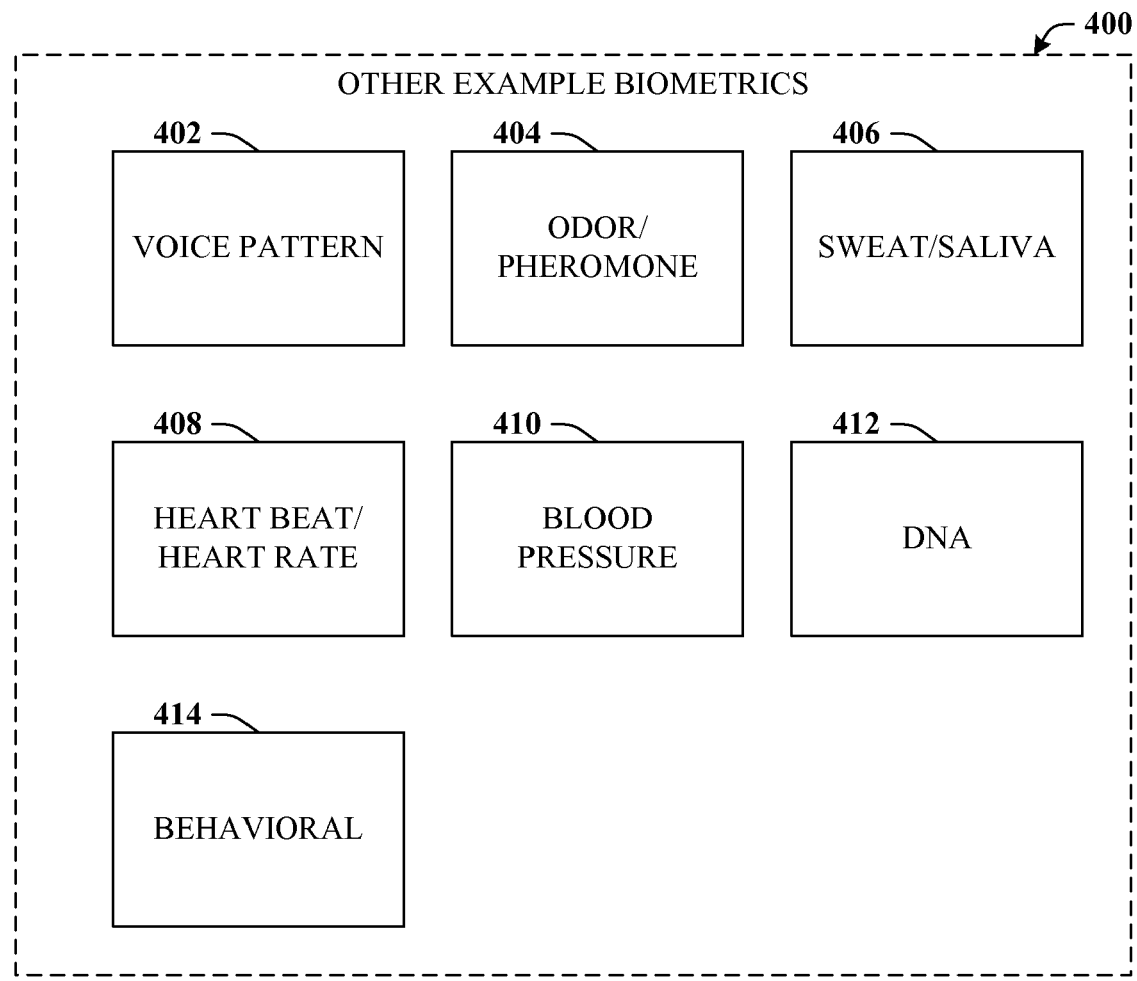
FIG. 4 illustrates a block diagram of additional biometrics that can be employed by the system 100.

While still referring to FIG. 1, but turning also to FIGS. 2-4, a variety of example biometrics 200, 300, 400, respectively, are illustrated. It is to be understood that the examples provided herein are intended to be illustrative but not intended to limit the scope of the claimed subject matter to just these examples. Rather, other types of biometrics are envisioned, and any suitable biometric can potentially have an application with respect to the claimed subject matter. Additionally, the example biometrics are organized into categories to aid in explanation of a number of the concepts herein, however, such organization is merely a matter of convenience and is not intended to suggest, e.g., that certain biometrics are exclusive of others.

In particular, FIG. 2 illustrates example hand-based biometrics 200, FIG. 3 depicts example face- or head-based biometrics 300, whereas FIG. 4 relates to other example biometrics 400. Biometric data is associated with a wide variety of categorizations, including but not limited to the following 7 aspects: universality, uniqueness, permanence, collectability, performance, acceptability, and circumvention. Universality generally relates to the commonality of the biometric, e.g., how common it is for the biometric to be extant in a user 104. Uniqueness relates to how distinguishing the biometric is between various users 104. Permanence is a metric that measures how well the biometric withstands change, such as repetition, growth, aging, etc. Collectability indicates the ease with which the biometric can be obtained for storage, analysis, or the like. Performance defines the accuracy, speed, or robustness of obtaining and/or utilizing the biometric. Acceptability relates to the level or degree of consent or approval with respect to utilizing the biometric. Circumvention measures the difficulty of generating fraudulent or counterfeit biometric data.

Most funding and research into biometric utilization is directed toward one or both of identification and authentication such as using a fingerprint or some other forensic information to ascertain the identity of an individual, or employing a signature to verify an individual is who he or she claims to be. As a result, biometrics have been commonly employed for purposes such as identification/authentication, however, there is little or no use of biometrics to facilitate convenience. Biometrics, although commonly employed for identification or authentication applications, is, arguably, not particularly well suited for such, largely due to numerous uncertainties as well as fraud-based activities. For example, given that many biometrics are not identifiably unique (which is a veritable requirement for most applications of identification or authentication), much of the available data is not useful for those applications. Additionally, even the biometrics that have a very high level of uniqueness (e.g., DNA or fingerprints) are often easily forged, counterfeited, or fraudulently used, especially when there is a powerful incentive for doing so, such as is the case for identity theft crimes. Studies have shown that biometrics are generally a poor substitute for other types of identification/authentication such as passwords, encryption technology, or the like.

Accordingly, while identification and authentication can be an important feature of the claimed subject matter, according to other aspects, these applications need not play a critical role. Rather, the claimed subject matter can be directed primarily toward notions of convenience, much of which inherently avoids any incentive to engage in fraudulent behavior. For example, identifying a user 104 based upon, say, a fingerprint, hand geometry, or some other biometric (e.g., verifiable identification input 108) and then applying personalized settings 112 associated with that user 104 to a television remote control (e.g., device 106) provides very little incentive or motivation to make fraudulent efforts to deceive the system 100. Accordingly, such a system 100 need not be bound to conventional constraints associated with applications of biometrics. However, according to other applications, the system 100 can be also prioritize notions of authentication. Many additional examples are provided infra.

Continuing with the discussion of FIGS. 1-4, example hand-based biometrics 200 can include but is not limited to the following. Fingerprints 202, which can itself include biometrics related to features of fingernails as well. Generally fingerprints 202 have a high degree of uniqueness, but has recently began to suffer in the circumvention category from new methods of fraudulent attacks. Another example hand-based biometric 200 can be hand geometry 204, which can relate to size, shape, or other dimensions of the user's 104 hand, including fingers, knuckles, wrists, etc. Typically, hand geometry 204 is only moderately unique among a given set of users 104, yet this type of biometric has a high level of collectibility. Additionally, a vein pattern 206 or other vascular features can be another example 200, as can a palm print pattern 208 or portion thereof Biometrics 206 and 208 traditionally have a relatively high level of uniqueness.

Likewise, a grip configuration 210 can be another example 200, such as the relative position of fingers when holding, touching, or interacting with the device 106. The uniqueness of a grip configuration 210 can vary across types of devices 106, but is generally only moderately unique, yet often provides a high degree of collectability. Another example 200 can be a hand thermogram 212 that can, e.g., employ a heat-based signature, as well as a keystroke dynamic 214 that can examine intervals, trajectories, rhythms, etc. as a user 104 is interacting with a keyboard, mouse, game controller or other suitable device 106. Keystroke dynamics 214 generally have a low level of uniqueness, whereas hand thermograms 212 and can provide relatively high uniqueness. It is readily apparent that, while not limited to such, hand-based biometrics 200 can be an ideal verifiable identification input 108 for use with handheld or haptics-based devices 106, such as those described in connection with FIG. 5.

Example face/head biometrics 300 can include a facial thermogram 302 that, like the hand thermogram 212, can relate to a heat signature, but in this case a heat signature of the face of the user 104. Facial features 304, including but not limited to features associated with an earlobe, forehead, lips, etc. of the user 104, can also serve as example biometrics 300, as can retinal features 306 and iris features 308. While hand-based biometrics 200 are perhaps better known and more widespread (e.g., fingerprints 202), face/head biometrics 300 can be among the more unique and (at least currently) among the least likely to be circumvented. As the majority of ones senses (e.g. sight, hearing, smell, taste) stem from this region of the body, face/head biometrics 300, while not limited to such, provide a ready type of biometric for I/O devices 106 and/or peripherals, which are also discussed further with reference to FIG. 5.

FIG. 4 depicts other example biometrics 400, which can include, e.g., a voice pattern 402. Voice patterns 402 typically provide a relatively low level of uniqueness unless the set of users 104 is reasonably small and commonly suffer from a low permanence as well, but have a high degree of acceptability. Another example 400 can be an odor or pheromone 404 or another bodily excretion such as sweat or saliva 406, all of which also generally has a low permanence, but can be moderately to highly unique. In addition heart beat patterns 408 (or rhythms, heart rate), as well as other vascular biometrics such as blood pressure 410 can also represent example biometrics 400.

It is to be appreciated that while the verifiable identification input 108 can be a biometric, some biometrics such as heart rate 408 may not be verifiable identification input 108, however, such biometrics can still be useful for other aspects, such as useful in applying or configuring settings 112. For example, a user 104 may configure settings 112 for an exercise device 106 in a particular way. While heart rate 408 may not verifiably identify the user 104, it can be employed to adjust the workout rate of the device 106 for that particular user 104, once determined. Thus, it is to be appreciated that in some cases a verifiable identification input 108 can be substantially any biometric, in certain situations, a verifiably identification input 108 can be limited to only the biometrics, devices, and/or applications described herein, or limited to subsets of the biometrics, devices, and/or applications described herein.

In addition, DNA 412 can represent another example biometric 400. DNA 412 has a high degree of uniqueness and permanence, but often is difficult to collect, has a low level of acceptability, and typically can be readily circumvented. Furthermore, similar to keystroke dynamics 214 and voice patterns 402, other behavioral biometrics 414 can likewise be included. Further examples of behavioral biometrics 414 can include stride or gait, signatures or handwriting, as well as posture, gestures, or other behavior dynamics, mechanics, or patterns.

Figure 5:
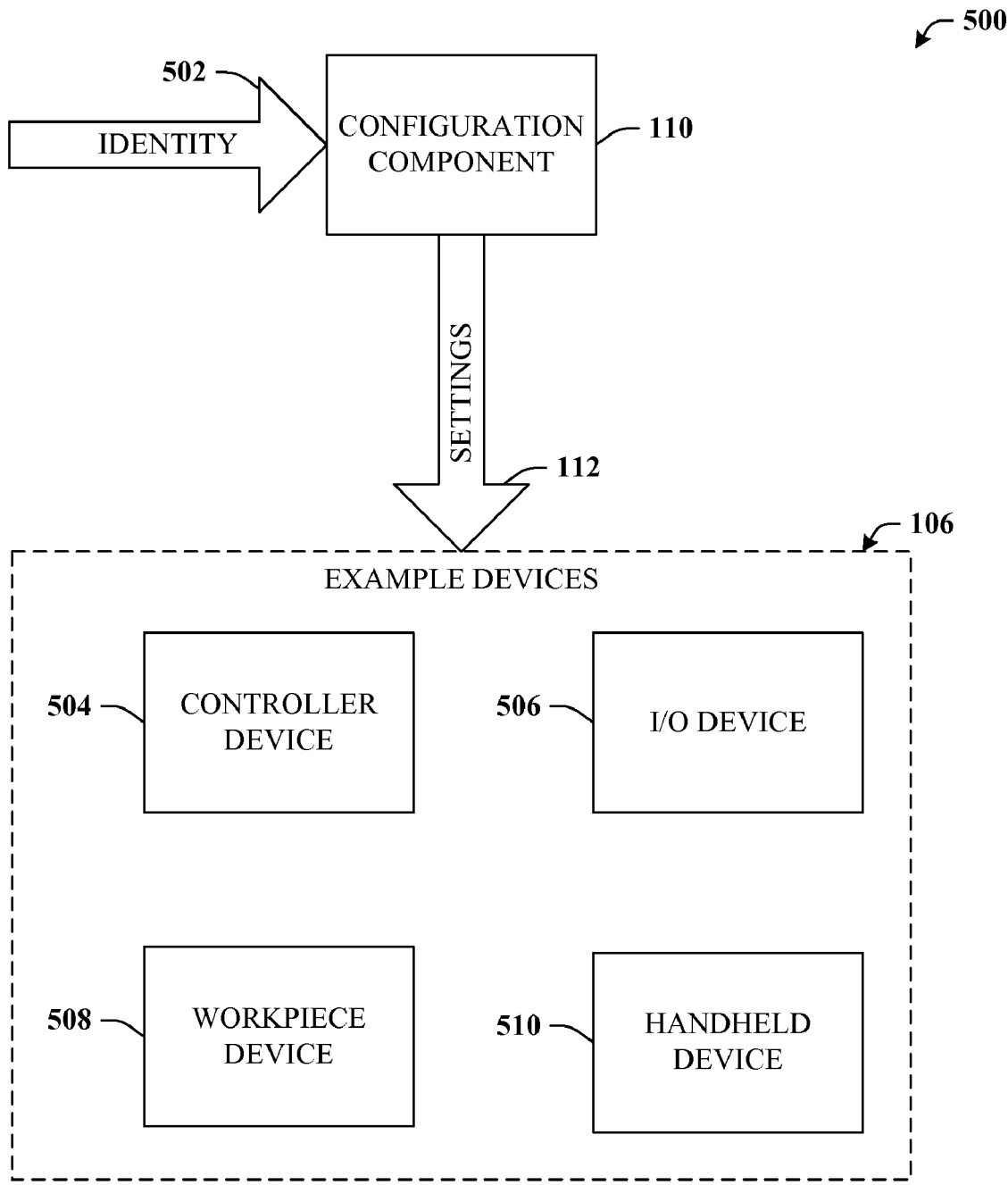
FIG. 5 is a block diagram that illustrates numerous example devices and further illustrates in more detail a system that can automatically configure the devices.

With reference now to FIG. 5, a block diagram that illustrates numerous example devices 106 and further illustrates in more detail a system 500 that can automatically configure the devices 106. In accordance with the foregoing, the system 500 can include the configuration component 110 that can retrieve settings 112 (e.g., from the data store 114) associated with a user (e.g., user 104) of the device 106, and can implement the settings 112 to the device 106. Commonly, the configuration component 110 receives the identity information 502 from the identity component 102 described supra.

As discussed herein, appreciably, the configuration component 110 can apply settings 112 to a wide range of devices 106 in accordance with the claimed subject matter. It is, of course, impossible to describe every suitable aspect, embodiment, and/or feature, however, the examples below provide numerous concrete illustrations to aid in further understanding and suitable appraisal of the spirit and scope of the claimed subject matter. Broadly, one suitable example device 106 can be a controller device 504. As used herein, the controller device 504 can be substantially any computer-based controller/processor resident in the device 106 (e.g., a component of the device 106) that is adapted to manage, maintain, control, or adjust one or more settings, aspects, features, components, or subcomponents (e.g., peripherals) of the device 106. It is to be appreciated that the controller device 504 can also be a software component such as a software application.

For example, device 106 can include numerous peripherals such as input or output (I/O) device 506 or workpiece 508, which can be controlled by the controller device 504, or, rather, directly affected by the configuration component 110, depending upon the particular application or embodiment. It is to be further appreciated that I/O devices 506 (e.g. game controllers, keyboards, mouse/mice or other input devices as well as speakers, displays, earpieces, eyepieces, headsets or other output devices) and workpieces 508 (e.g., frames, supports, handles, clothing, jewelry, artwork, etc.) might also have mechanical and/or manual features that can be adjusted by the user 104, or controls or interfaces to direct the controller device to manage these particular features. In addition, the device 106 can also be a handheld device 510. While in some cases, handheld device 510 (e.g., game controller, cellular phones, remote controls) might well be categorized as a controller device 504, it can be readily described separately to facilitate further appreciation of the claimed subject matter, e.g., due to a wealth of concrete examples associated therewith. Provided below are a number of example devices 106 as well as a variety of potential applications that can be better described with reference back to FIG. 1.

As one example previously introduced, the device 106 can be a remote control unit (e.g., for a television, satellite, DVR, etc.). Remote control units are commonly applicable to only a single household or office and, thus, generally might have a very small set of potential users 104. Accordingly, a verifiable identification input 108 need not require a particularly high degree of uniqueness to be employed effectively. One or more biometric templates (e.g., a template for one or more types of biometric) can be collected for each potential user 104 and stored in the data store 114. When a user 104 handles the remote, or interacts with the remote in a manner consistent with obtaining a particular biometric, the identity component 102 can identify that particular user 104 from the set of potential users 104 (e.g., by utilizing one of the hand-based biometrics 200 from FIG. 2 or another type of biometric or verifiable identification input 108). The configuration component 110 can retrieve the settings 112 from the data store 114 and apply those settings 112 to the remote.

For example, consider the following example application. Suppose that Ashley typically watches television during the day when no one else is home, whereas Ross typically views television programs late at night while others in the household are asleep. By way of on-screen programming or some other suitable method such as interfacing the remote (or other device 106) with a configuration application (e.g., running on a computer), Ashley can configure her settings to automatically turn on the television when she picks up the remote (or otherwise provides the verifiable identification input 108) rather than pressing a power button, for example. On the other hand, when Ross picks up the remote it can be determined that it is he, and not Ashley who is the user 104, thus, the television can be activated based upon his settings 112 such as power on with low volume, and tuned to Ross' favorite channel, for instance. In addition to a list of favorite channels, other tailored content can be provided based the settings 112.

To continue the scenario further, the television can be configured to display multiple channels simultaneously. Such can be accomplished by way of well-known picture-in-picture technology that allocates different portions of the screen to different channels, or based upon an alternate technology altogether, such as displaying multiple views simultaneously wherein each view potentially employs the entire surface of the screen, but is substantially visible only when observed from a particular range of observation angles. In either case, any user 104 can employ the remote in a manner that only affects his or her own view without the necessity of making some selection such as flipping a switch or pressing a button on the remote, but rather based upon which user 104 is operating the remote.

Of course many other types of devices 106 can be employed and configured in ways that are similar to the description above as well as in ways that are unique to the particular device 106 and/or the particular application of the device. For example, by employing the claimed subject matter, telephones (e.g., wired, wireless, cellular) can be automatically adapted to a given user 104 by, e.g., tailoring speed dial numbers stored, last number called, contact lists, ring tones, and even account billing. It is to be appreciated that the telephone (or other device 106) need not be a personal phone, but can potentially be a public telephone such as a pay phone. In this case, it may be preferable to employ a biometric that has a high degree of uniqueness or additionally or alternatively, only allow certain numbers to be called if there is an associated charge. Also in this case, it may be preferable to maintain the data store 114 in a location that is remote from the pay phone (e.g., a remote, trusted data manager). In accordance therewith, providing a fingerprint, voice command, iris scan, or some other verifiable identification input 108 to a public pay phone can facilitate access to personalized settings 112 such as access to a contact list anywhere in the world, automatic account billing for convenient change-/money-free calling and so forth.

Hence telephones as well as many other devices 106 can conceivably become generic and at the same time provide much richer features automatically tailored to various users 104. For example, while the claimed subject matter can be applicable to Personal Digital Assistants (PDA's), games, game controllers, media players, cameras, key fobs, and so on, it can also be applicable to an all-in-one (e.g., generic) device 106 that can conceivably morph or adapt to provide different content and/or features based upon the user 104. For instance, a small, inexpensive, handheld (or another type of) device 106 can be configured as to act as a music player for one user 104 but as a camera for another user 104. Moreover, the music player can expose a music library (conceivably stored remotely in a cloud that is accessible from virtually anywhere and with virtually any device) specific to the a current user 104, whereas the camera can, e.g. automatically be set for particular settings 112 such as shutter speed, resolution and so on. In addition, the device 106 could be a hardware or software multimedia player/viewer that aids in automated fusion of content for self-expression. For instance, the multimedia player could match music to pictures or video (or vice versa) and do so based upon the user's 104 identity.

The device 106 can also be, e.g., an avatar of the user 104, which can be based upon computer-generated graphics, video, and/or Virtual Reality (VR). Upon determining the identity of the user 104, the correct avatar can be displayed. Moreover, addition biometric data can be employed to change the avatar in various ways, such as changes to moods, emotions, etc. that can be represented in the avatar. In accordance with another aspect, the avatar could be employed in a reverse manner. For example, rather than extending the user's 104 emotions or biometrics to the avatar, such data (or portions thereof) can be purposefully kept from being displayed on the avatar based upon the settings 112. Hence, an avatar that can maintain a "poker face" by not giving away certain emotions or responses, which can be useful in, say, video conference negotiations or even a game of poker.

The device 106 can also be an "electronic butler" that employs peripherals including but not limited to an earpiece (e.g., Bluetooth, implants . . . ) or headset as well as an eyepiece configured to provide VR overlays. The butler can verbally aid the user 104 by articulating various information by way of the earpiece or visually aid the user 104 by displaying VR objects in connection with the user's 104 environment, the latter of which can be implemented by way of a raster projection directly into a retina or some other technology. Further examples include speaking the name or displaying a name bubble over a person's head at a business or social gathering, speaking or displaying an indication of where the user 104 put her keys, etc. It is readily apparent that the electronic butler can provide numerous other features and can be configured, personalized, and/or tailored based upon settings 112 that can be applied upon determination of the identity of the user 104.

According to another aspect, the device 106 can be a type of artwork that changes configurations based upon the identity of the user 104. Similarly, the device 106 can be associated with one or more displays or holodecks that react or provide I/O functions based upon the identity of the user 104. For example, multiple holodecks (or even more common applications such as word processor documents, spreadsheets, etc.) can be employed for project status of group projects. Changes at one location can be propagated to other locations with suitable tags, permissions, and so forth set to and/or based upon the identity of the user 104.

It is to be appreciated that numerous other applications are suitable and to be considered within the spirit and scope of the appended claims. For instance the device 106 can be a bed, sofa, chair or seat, or another support device that dynamically adjusts in a manner consistent with a user's 104 preferences or tastes. Household appliances, thermostats, automobiles, jewelry or apparel, or substantially any item that is configurable for multiple users and/or multiple preferences can conceivably benefit from the dynamic identity detection and/or automatic application of settings described herein.

Figure 6:
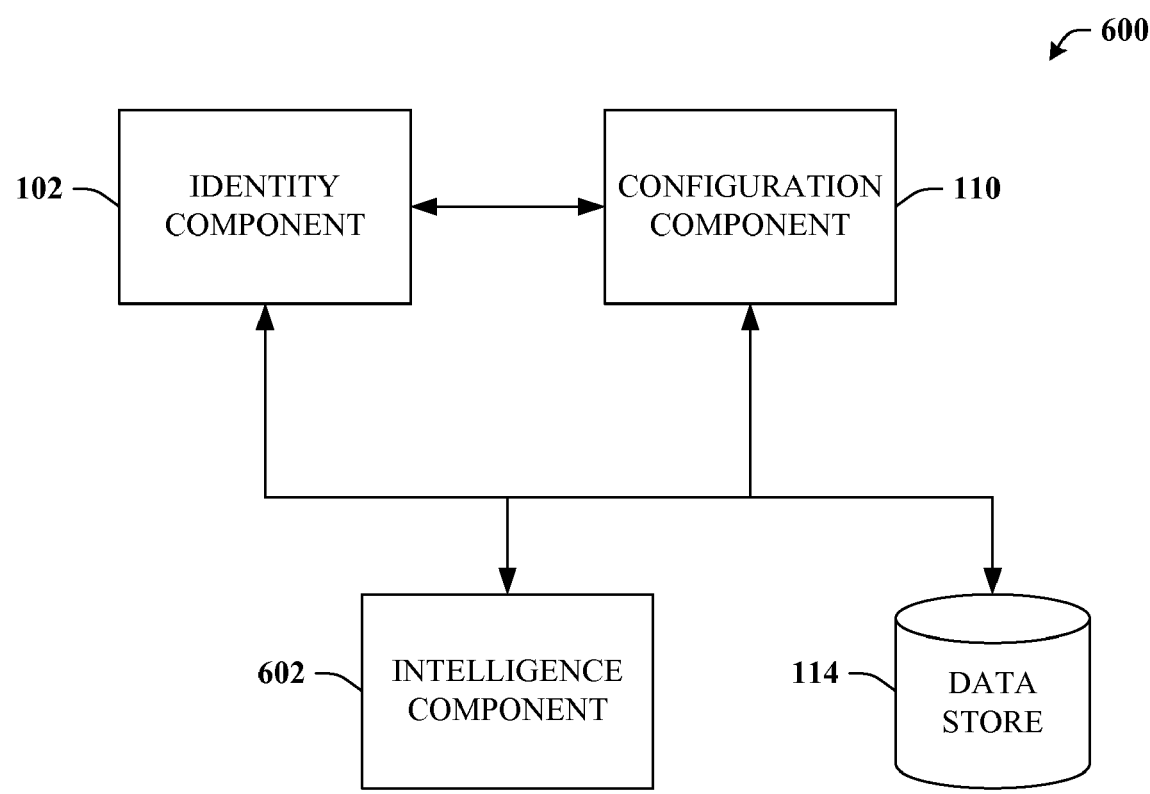
FIG. 6 depicts a block diagram of a system that can intelligently facilitate user identification and/or dynamic adaptation of a device.

Turning now to FIG. 6, a system 600 that intelligently facilitates user identification and/or dynamic adaptation of a device is illustrated. Generally, the system 600 can include the identity component 102 that can determine the identity of the user based upon verifiable identification input such as a biometric, and the configuration component 110 that can retrieve settings associated with a current user (e.g., from a local or remote data store 114) and apply those settings to the device.

In addition, the system 600 can also include an intelligence component 602 that can be operatively coupled to the identity component 102, the configuration component 110, and/or the data store 114. As with the data store 114, the intelligence component 602 can also be remote from the identity component 102 and the configuration component 110. As one example, the identity component 102 and the configuration component 110 can reside in the device, whereas the data store 114 and the intelligence component 602 can reside in a remote, trusted location or separate locations.

The intelligence component 602 can select a type of verifiable identification input (e.g., a type of suitable biometric) to be employed. For example, a device can be capable of obtaining many different types of biometrics (or types of other verifiable identification input). While the identity component 102 can employ multiple types of verifiable identification input substantially simultaneously to determine the identity of the user, it can still be preferable in some cases to select only one or a small set of types to be utilized (e.g., obtained and employed to determine the identity). Ideally, the intelligence component 602 can select the best or optimal type or set of types to utilize based upon a wide array of factors.

As one example, the intelligence component 602 can select the type based upon features included in the device. For instance, the device may only be adapted to ascertain certain types of verifiable identification input based upon associated hardware/software or based upon a manner in which a user interacts with the device. According to another aspect of the claimed subject matter, the intelligence component 602 can select the type based upon a size of a set of potential users of the device as well as certain similarities or distinctions between members of the set of potential users. That is, the intelligence component 602 can select the type based upon a uniqueness of the verifiable identification input with respect to the set of potential users.

Hence, while, say, a remote control unit (e.g., device) may be readily adapted to obtain many hand-based biometrics such as those described in connection with FIG. 2, the remote control unit may not be suitable to obtain certain other types of verifiable identification input such as the behavioral biometric relating to stride or gait. However, it is to be appreciated that other devices (e.g., a video camera, a tennis shoe . . . ) apart from a remote control unit may be particularly well-suited to obtain the latter types of biometrics.

Returning to the example remote control unit described supra, consider the case in which there is no suitable component for obtaining a hand thermogram, and where the set of potential users consists of Ashley and Ross. Accordingly the intelligence component 602 can readily rule out a hand thermogram. However, suitable components do exist to obtain keystroke dynamics, grip configuration, and hand geometry, any one of which can be useful to the identity component 102 for determining the identity of the current user. In one case, the intelligence component 602 can determine that keystroke dynamics are relatively computationally difficult to distinguish or there is a high latency period for input retrieval before a determination can be made, which is not conducive to this type of device because certain settings may need to be applied immediately (e.g., Ashley's setting to automatically turn on the television without the need to manually press the power on button). Accordingly, in such a case, the intelligence component 602 can determine or infer that keystroke dynamics may not be an optimal selection.

It can further be supposed that Ashley and Ross both interact with the device employing a similar grip configuration, however, their respective hand geometries are dramatically different. In accordance therewith the intelligence component 602 can determine or infer that hand geometry is an optimal verifiable identification input and that one of the device or the identity component should employ that type.

In accordance with another aspect of the claimed subject matter, the intelligence component 602 can infer default user settings. Such can be especially useful when the data store 114 resides in a remote and/or centralized location and warehouses personal data relating to the users such as physical characteristics, likes, dislikes, interests, goals, objectives, demographics and so on. Thus, the data store can collect potentially useful information about a user from one device (e.g., television viewing habits from the remote control unit) and use that information for configuring settings for other devices without the need for the user to manually define preferred settings. For example, if Ashley manually adjusts the firmness settings of a sofa toward the low end (e.g., very soft/pliant), then this preference can be stored in the data store 114, and the intelligence component 602 can infer that such as setting may apply to her preferred portion of a bed, to a recliner when she is the user, and so on.

It is to be appreciated that the intelligence component 602 can employ a wide variety of data or data sets to facilitate numerous determinations and/or inferences. In particular, the intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
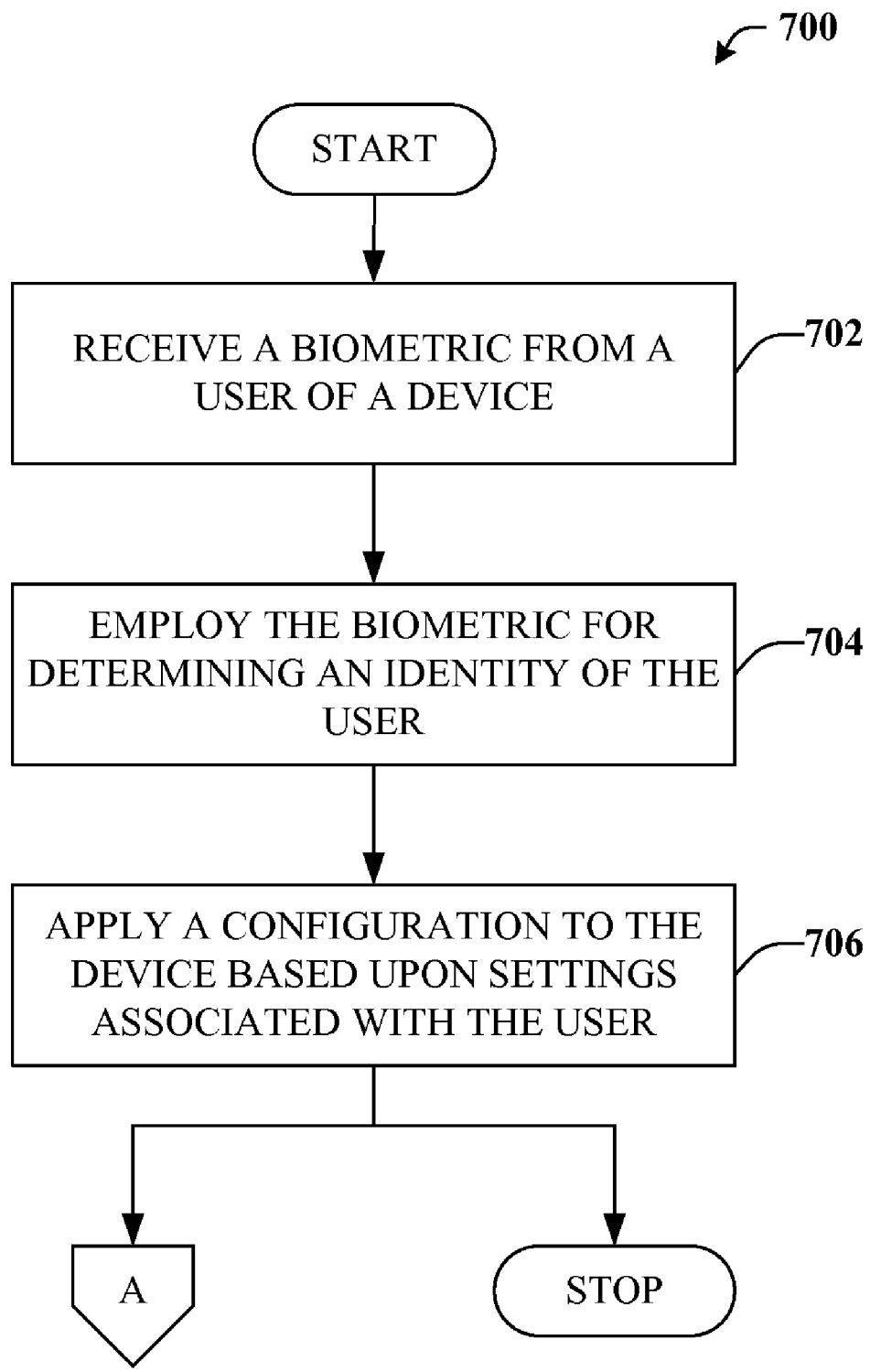
FIG. 7 is an exemplary flow chart of procedures that define a method for configuring a device based upon detecting an identity.
Figure 8:
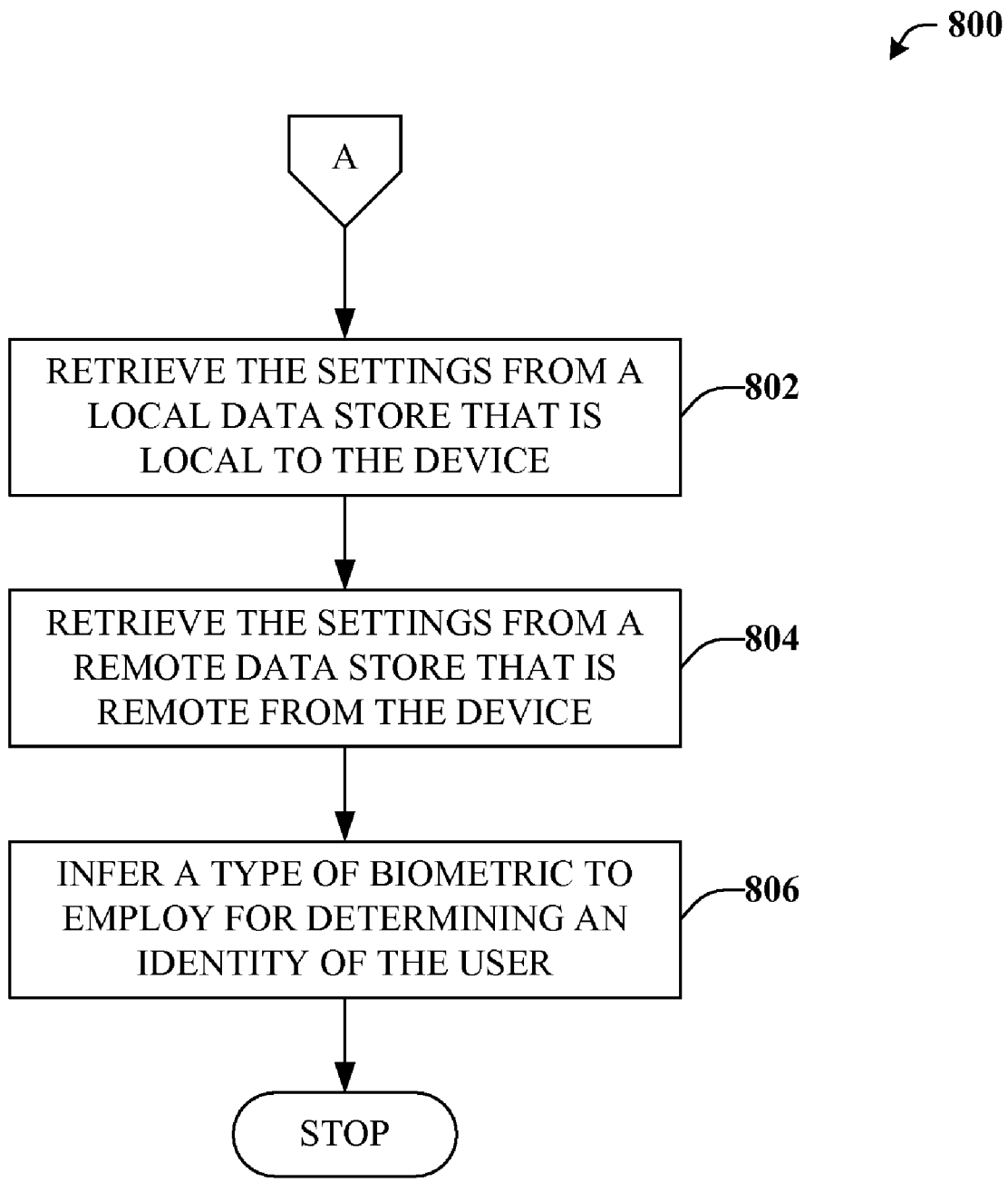
FIG. 8 illustrates an exemplary flow chart of procedures that define a computer implemented method for employing additional features for configuring a device based upon detecting an identity.

FIGS. 7 and 8 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, an exemplary method 700 for configuring a device based upon detecting an identity is illustrated. In general, at reference numeral 702, a biometric from a user of the device can be received. It is to be appreciated that the types of biometrics are virtually unlimited, however, certain biometrics can be preferable over others based upon how well a biometric performs across categories (e.g., uniqueness, permanence, circumvention . . . based upon device type and/or components associated therewith, or a typical manner of interacting with the device, and so forth. For example, a configurable pair of glasses might be better suited to obtain an iris biometric, whereas a configurable earpiece might be better suited to obtain an earlobe biometric.

At reference numeral 704, the received biometric can be employed for determining an identity of the user. For example, templates consisting of known biometric samples or patterns can be stored in a data store, accessed and compared to the received biometric for a match. At reference numeral 706, a configuration can be automatically applied to the device based upon settings associated with the user. It is to be appreciated that the applied settings can relate to a physical configuration of the device as well as a data set employed by the device. For instance, the applied settings can relate to the firmness of a mattress (e.g., a physical configuration) as well as a user's multimedia library (e.g., a data set).

Referring now to FIG. 8, an exemplary method 800 for employing additional features for configuring a device based upon detecting an identity is depicted. Reference numerals 802 and 804 can both relate to the settings discussed in connection with act 706 of FIG. 7. In particular, at reference numeral 802, the settings can be retrieved from a local data store that is local to the device. For example, the data store can be a component of the device itself At reference numeral 804, the settings can be retrieved from a remote data store that is remote from the device. For instance, the data store can be a centralized data store, potentially storing a variety of information about many users, which can be potentially accessed by many disparate devices. Additionally or alternatively, the data store can be remote from the device, but still maintained by the user (e.g., a data store resident on, say, a personal computer).

At reference numeral 806, a type of biometric to employ for determining an identity of the user can be inferred. For example, many different types of biometrics can exist, however, based upon several factors, some may be better suited for a particular device or application than others. Moreover, some biometrics may be preferred over others based upon the size of a set of potential users, as well as observed biometric distinctions with respect to the set of potential users.

Figure 9:
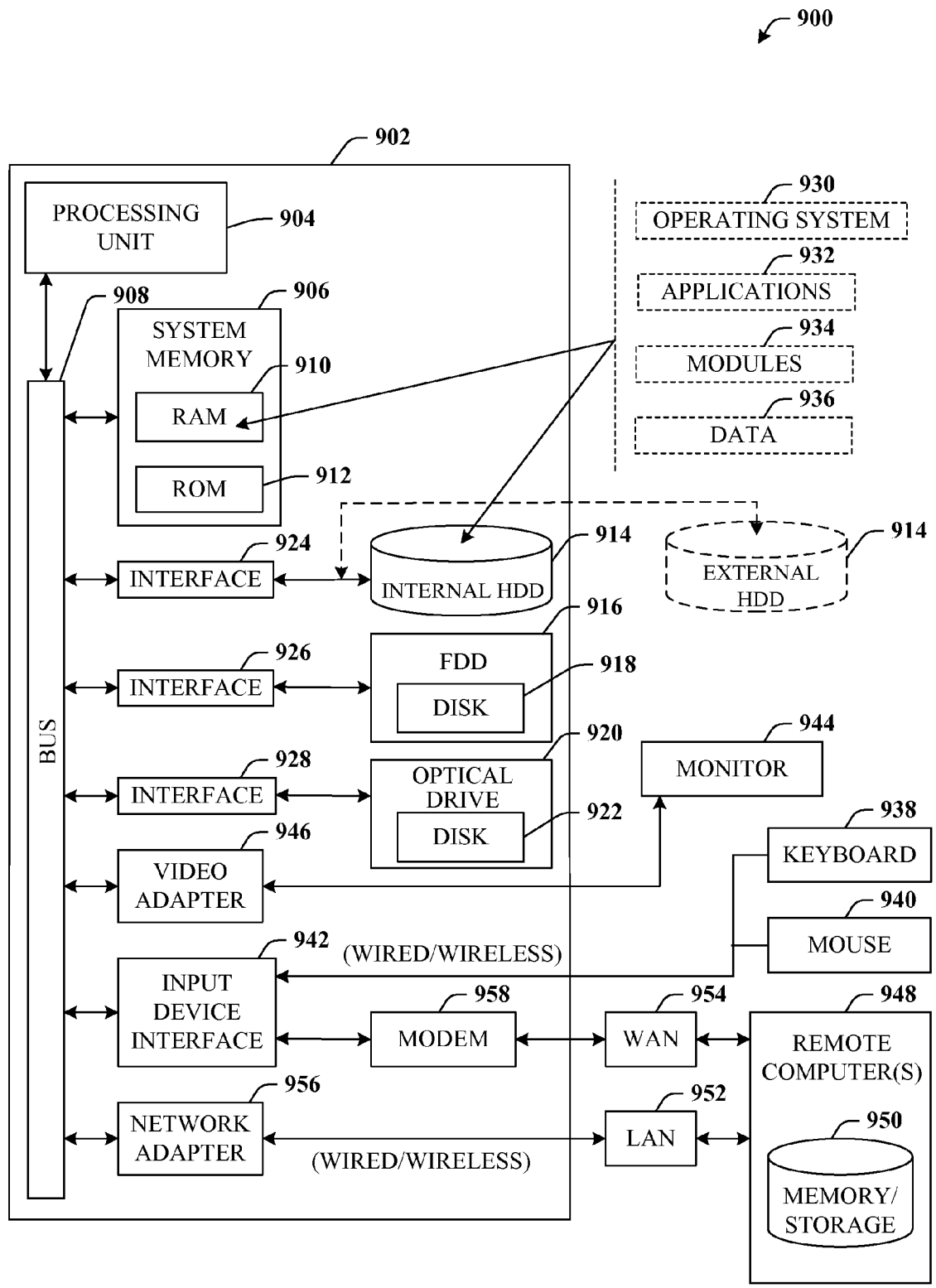
FIG. 9 illustrates a block diagram of a computer operable to execute the disclosed architecture.

Referring now to FIG. 9, there is illustrated a block diagram of an exemplary computer system operable to execute the disclosed architecture. In order to provide additional context for various aspects of the claimed subject matter, FIG. 9 and the following discussion are intended to provide a brief, general description of a suitable computing environment 900 in which the various aspects of the claimed subject matter can be implemented. Additionally, while the claimed subject matter described above can be implemented in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the claimed subject matter includes a computer 902, the computer 902 including a processing unit 904, a system memory 906 and a system bus 908. The system bus 908 couples to system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE1394 interface technologies. Other external drive connection technologies are within contemplation of the claimed subject matter.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the claimed subject matter can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 9BaseT wired Ethernet networks used in many offices.

Figure 10:
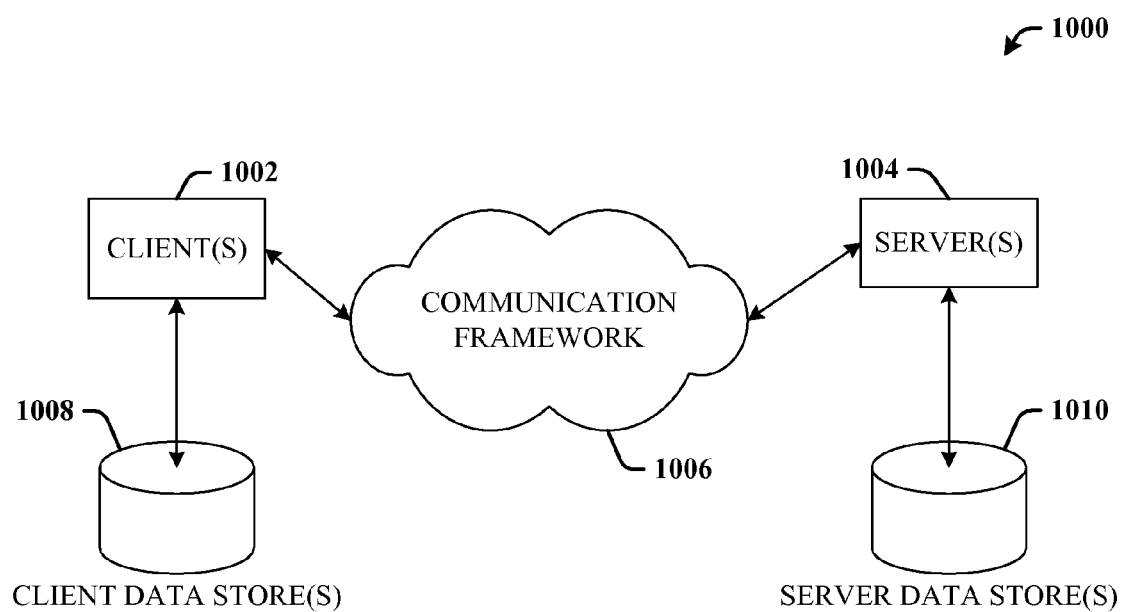
FIG. 10 illustrates a schematic block diagram of an exemplary computing environment.

Referring now to FIG. 10, there is illustrated a schematic block diagram of an exemplary computer compilation system operable to execute the disclosed architecture. The system 1000 includes one or more client(s) 1002. The client(s) 1002 can be hardware and/or software (e.g., threads, processes, computing devices). The client(s) 1002 can house cookie(s) and/or associated contextual information by employing the claimed subject matter, for example.

The system 1000 also includes one or more server(s) 1004. The server(s) 1004 can also be hardware and/or software (e.g., threads, processes, computing devices). The servers 1004 can house threads to perform transformations by employing the claimed subject matter, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system operatively coupled to a device, the system automatically configures the device based on identity detection, comprising:
    an intelligence component that selects a type of verifiable identification input based upon a size of a set of potential users or based upon a uniqueness of the verifiable identification input with respect to the set of potential users;
    an identity component that determines an identity of a user of a device based upon the verifiable identification input associated with the user; and
    a configuration component that retrieves settings associated with the user and applies the settings to the device; and
    wherein the intelligence component automatically infers the settings associated with the user based on a probabilistic or statistical-based analysis of user information stored in a data store.

2. The system of claim 1, the verifiable identification input is a biometric of the user of the device.

3. The system of claim 2, the biometric is at least one of a fingerprint, a hand geometry, a hand vein pattern, a palm pattern, a grip configuration or dynamic, a hand thermogram, or a keystroke dynamic.

4. The system of claim 2, the biometric is at least one of a facial thermogram, a facial feature, a retinal feature, or an iris feature.

5. The system of claim 2, the biometric is at least one of a voice pattern, an odor or pheromone, a sweat pore or salivary excretion, a heart rate, a blood pressure, or DNA.

6. The system of claim 1, the device is at least one of a game controller, media player, camera, or key fob.

7. The system of claim 1, the device is an input or output device configured to provide virtual reality (VR) overlays and the device is at least one of an earpiece, a headset, or an eyepiece.

8. The system of claim 1, the device is a controller device.

9. The system of claim 1, the settings are associated with a physical configuration of the device.

10. The system of claim 1, the settings are associated with a data set employed by the device.

11. The system of claim 1, the intelligence component selects the type of verifiable identification input based upon features included with the device.

12. The system of claim 1, the configuration component retrieves the settings from a data store that is remote from the device.

13. A method for configuring a device based upon detecting identity, comprising:
   inferring a type of biometric to employ for determining an identity of a user of the device based on universality, uniqueness, and permanence of the biometric;
   receiving the biometric from the user of the device;
   employing the biometric for determining the identity of the user of the device; and
   applying a configuration to the device based upon settings associated with the user of the device, the settings associated with the user of the device are automatically inferred based on a probabilistic or statistical-based analysis of user information stored in a data store.

14. The method of claim 13, the act of applying relates to a physical configuration of the device.

15. The method of claim 13, the act of applying relates to a multimedia library employed by the device.

16. The method of claim 13, further comprising at least one of the following acts:
   retrieving the settings from a local data store that is local to the device; or
   retrieving the settings from a remote data store that is remote from the device.

17. The method of claim 13, universality comprises how common it is for the biometric to be extant in one or more given users, uniqueness comprises how distinguishing the biometric is between various users, and permanence comprises how well the biometric withstands change over time.

18. A method for modifying an arrangement associated with a device in accordance with an identity of a user of the device, the method comprising:
   obtaining multiple types of biometrics from the user of the device;
   selecting a one of the multiple types of biometrics for establishing the identity of the user of the device, the selecting based on a size of a set of potential users and a uniqueness of the selected biometric with respect to the set of potential users;
   utilizing the selected biometric for establishing the identity of the user of the device; and
   adapting the device in accordance with settings associated with the user of the device, the settings associated with the user of the device are automatically inferred based on a probabilistic and statistical-based analysis of user information stored in a data store.

* * * * *